Figure 1:
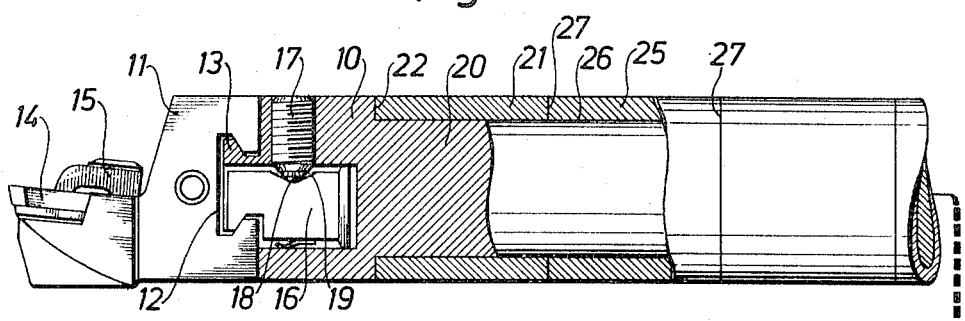

United States Patent [19]
Lindskog

[11] 3,859,699
[45] Jan. 14, 1975

[54] CUTTING TOOL
[75] Inventor: Bo Gosta Lindskog, Sandviken, Sweden
[73] Assignee: Sandvik Aktiebolag, Sandviken, Sweden
[22] Filed: Nov. 15, 1973
[21] Appl. No.: 415,987

[30] Foreign Application Priority Data
Dec. 12, 1972 Sweden.............................. 16154/72

[52] U.S. Cl.................................... 29/96, 408/143
[51] Int. Cl.............................................. B26d 1/00
[58] Field of Search................... 29/95, 96; 408/143

[56] References Cited
UNITED STATES PATENTS
2,641,940  6/1953  White ............................... 408/143

2,835,023  5/1958  Steeves .................................... 29/96
3,292,237  12/1966  Fisher .................................... 29/96

*Primary Examiner*—Harrison L. Hinson
*Attorney, Agent, or Firm*—Pierce, Scheffler & Parker

[57] ABSTRACT

In an elongated boring and turning tool that includes an elongated bar and a cutting head, the bar comprises a steel support member and an outer tubular shaft of hard metal, which shaft is composed of a plurality of rings whose inner surfaces make a tight fit on said support member. The inner diameter of the rings is 70–90 percent of their outer diameter.

4 Claims, 2 Drawing Figures

CUTTING TOOL

The present invention relates to machine tools for internal cutting, such as boring and turning bars with permanent or interchangeable and adjustable heads, and is concerned with the provision of improved elongated boring and turning tools.

In boring or turning long holes there often are encountered problems with vibrations and deflections because the so-called slenderness ratio (the ratio between length and diameter, $l/d$) of the boring bar is too great in relation to the modulus of elasticity, E. The practical limit is at $l/d = 4$–6, the number 4 relating to thin, and the number 6 relating to thicker, dimensions of boring bars made of steel.

A decreased deflection can be obtained by choosing a material having greater modulus of elasticity than that of steel, for example, sintered hard metal or cemented carbide. Because generally used grades or qualities of this material have about 2–3 times greater modulus of elasticity than steel, a corresponding increase in the rigidity of the structure is obtained. The present known boring bars of hard metal have been shaped either as an essentially massive bar or as a thick-walled tube which suitably has been prestressed by means of an inner draw-bar or equivalent of steel or the like. Such boring bars of hard metal have, however, been both difficult and expensive to manufacture. Because of their greaat rigidity and weight such bars are also diposed to vibrate, which characteristic decreases the accuracy and surface finish of the machined workpiece and causes high strain in the bar.

Figure 2:
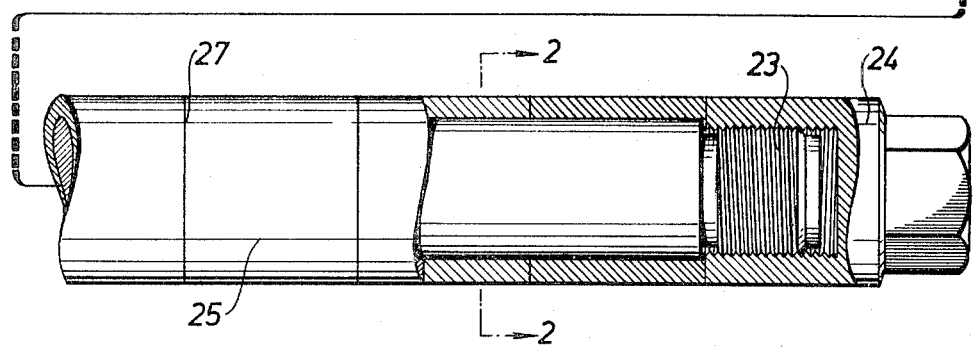
Figure 2:
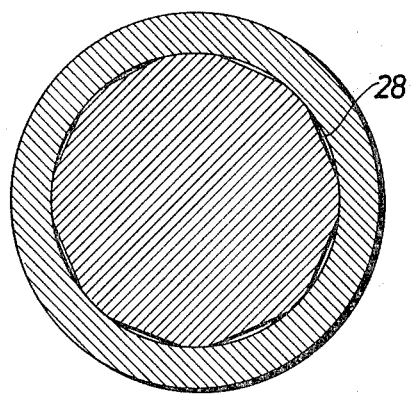

According to the present invention there is now available an elongated cutting tool which solves the mentioned problems in a simple way, and which fulfills different demands. The invention will become more apparent upon reference to the following specification in connection with the accompanying drawing, in which:

FIG. 1 is a horizontal, partly sectional, view of a cutting tool in the form of a turning bar according to the invention; and FIG. 2 is a cross-sectional view taken along the line 2—2 in FIG. 1.

The tool shown in FIGS. 1 and 2 consists of a bar 10 having a cutting head 11 applied to the front end of the bar. The cutting head is adjustable in radial direction. In the embodiment shown, in order to obtain slideable mounting, the cutting head is provided with a groove 12 embracing a corresponding tenon or tongue 13 of the bar. On the cutting head an insert 14 is held by clamping means 15. The cutting head 11 is held by a lever 16, a screw 17 with a ball 18 in its end, acting upon the lever in a conical groove 19 so that a resultant force is formed, workking obliquely downwardly-backwardly.

The bar 10 consists essentially of a support member 20 of steel or the like and an outer tube-formed shaft 21 of sintered hard metal or corresponding material. The support member 20 is reduced in width (along its main part) by turning and grinding, and has a step 22 at its front end. On the bar end the support member is provided with threads 23. The hard metal shaft 21 has been prestressed by means of the nut 24 by which a compressive stress is formed in the hard metal and a tensile stress in the steel support member. The prestress is usually so large that the compressive stress shall never be below zero in the outer surface of the hard metal at calculated maximum load of the support member.

It is a feature of the invention that the outer hard metal shaft consists of several thin-walled, preferably uniform, cases or rings 25. In the embodiment shown, the inner surfaces 26 of the cases are carefully lapped, as are the plain or end surfaces 27, to give a good fit on the support member.

By means of the mentioned division of the hard metal shaft into a plurality of cases several essential benefits are obtained. Thus, short cases or rings of cemented carbide are easy to manufacture in pressing tools and relatively easy to finish in automatic machines, as compared to long tubes or bars formed of the same material. it has also been found that the division into relatively short cases or rings causes an improved damping which, according to the preceding text, can be of crucial importance for elongated tools of said kind.

In the tool according to the invention the support member 20 of steel (including the front coupling for cutting heads) is the main part. It is, in principle, only stiffened by the hard metal cases. The area ratio between cases and support member is such that the steel at the same force is not loaded to the yield point. In comparison with the earlier known boring bars having a thick-walled or massive hard metal part, the cutting tool according to the invention has a considerably lower weight. The faster self-damping, which has been found in the tool according to the invention, is caused by this fact.

The stiffening effect is greatest at the periphery of the bar, and that means that in this case there is attained a favorable proportion between weight and rigidity. A low weight of the tool is important, particularly when the construction is used together with some kind of "built in" damping device. One of the factors determining the damping capacity is the proportion between the weight of the damping device and the weight of the support member in the boring bar. The damping device should be as heavy as possible and the support member as light as possible.

The construction can, as indicated, be used in different combinations, among which the following per se known types may be mentioned: permanent turning or boring bar; bar with cooling liquid supply; bar with interchangeable heads; bar with damping; bar with adjustable damping. All this is made possible in an easy way because the core and the front part of the support member consist of steel.

In the embodiment shown, the boring bar has partial cuts 28 along its whole length, or along some part thereof counted from the step 28. This measure takes the strains which arise at an increase in the temperature because of the different thermal expansion of steel respectively cemented carbide.

Performed tests with the cutting tool according to the invention have shown that the deflection at static load is only about 10–20 percent greater than for a corresponding tool entirely in hard metal. A corresponding steel tool showed about 2.6 times greater deflection.

As noted hereinabove, the dimensions of the hard metal shaft and the steel support member have been set to an optimum in the tool according to the invention. The prestress of the hard metal cases shall thus be so great that there always are remaining compressive forces in the upper face of the shaft at maximum cutting data. The entire tensile strain in the surface of the steel must not surpass the yield point. On the other hand, the entire compressive strain in the hard metal must not surpass the maximum allowed.

In order to fulfill the mentioned demands, and to obtain the favorable effects concerning stiffness, damping, etc. which has been touched on earlier, the inner diameter of the hard metal rings must be 70–90 percent,- and preferably 75–85 percent,- of the outer diameter. The inner surfaces of the rings lie close to the support member. In practice, it has been found suitable to choose the diameter dimensions of rings respectively support member according to so-called "renard-series". The inner diameter may be chosen one step smaller than the outer diameter, for example:

Outer diameter (mm) 25 32 40 50 63 80.
Inner diameter (mm) 20 25 32 40 50 63.

This means that the inner diameter is about 78–80 percent of the outer diameter. In the general dimensional calculations a central bore hole in the bar for cooling medium supply has been considered.

As has been mentioned earlier, it is particularly in combination with some type of built-in damping device that the tool according to the invention has proved to possess superior properties. On these occasions it has often been desirable to place the damping body or device as near to the cutting insert as possible. Compared to the embodiment shown in FIG. 1, a shorter lever 16 may be used because the damping body normally is placed in the bar or supporting member 20, immediately "behind" the lever.

I claim:
1. Machine tool for internal cutting, which includes a bar (10), and an interchangeable and adjustable cutting head (11) provided with an attached cutting insert (14), applied to the front end of the bar, the bar (10) consisting essentially of an elongated support member (20) of steel and an outer tube-shaped shaft (21) of hard metal arranged to be prestressed via the mentioned support member by means of an adjustable tensile device (24);
the hard metal shaft (21) consisting of several, generally uniform, rings or cases (25) the inner diameter of which is 70–90 percent, preferably 75–85 percent, of the outer diameter,
the inner surfaces (27) of the cases lying close to the support body (20) carrying the cutting head (11).
2. Cutting tool according to claim 1, wherein the outer tube-shaped shaft (21) is formed of cemented carbide.
3. Cutting tool according to claim 1, in which the support member (20) is provided with partial cuts (28) along the envelope surface.
4. Cutting tool according to claim 1, characterized in, that the support member (20) is provided with a step (22) in its front part which step is arranged to rest against one end face of a hard metal ring.

* * * * *